United States Patent
An et al.

(10) Patent No.: US 12,454,170 B2
(45) Date of Patent: Oct. 28, 2025

(54) FLOOR STRUCTURE OF REAR VEHICLE BODY

(71) Applicants: HYUNDAI MOTOR COMPANY, Seoul (KR); Kia Corporation, Seoul (KR)

(72) Inventors: Byeongdo An, Anyang-si (KR); Mun Soo Cha, Suwon-si (KR); MokYeon Hong, Seoul (KR); Heedae Oh, Suwon-si (KR); Jeong Chul Jung, Hwaseong-si (KR); Yong Dok An, Anyang-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 282 days.

(21) Appl. No.: 17/883,146

(22) Filed: Aug. 8, 2022

(65) Prior Publication Data
US 2023/0038380 A1 Feb. 9, 2023

(30) Foreign Application Priority Data
Aug. 9, 2021 (KR) .......... 10-2021-0104417

(51) Int. Cl.
*B60K 1/04* (2019.01)
*B60K 15/03* (2006.01)
*B62D 21/11* (2006.01)

(52) U.S. Cl.
CPC ............ *B60K 1/04* (2013.01); *B60K 15/03* (2013.01); *B62D 21/11* (2013.01); *B60K 2001/0416* (2013.01); *B60K 2001/0438* (2013.01)

(58) Field of Classification Search
CPC .. B60K 1/04; B60K 15/03; B60K 2001/0416; B60K 2001/0438; B62D 21/11
See application file for complete search history.

(56) References Cited

U.S. PATENT DOCUMENTS

| | | | | |
|---|---|---|---|---|
| 6,793,027 | B1 * | 9/2004 | Yamada | B60L 3/0046 180/65.1 |
| 9,302,723 | B1 * | 4/2016 | Pollitzer | B60T 13/741 |
| 10,272,796 | B2 * | 4/2019 | Kouno | B60K 1/04 |
| 11,529,859 | B2 * | 12/2022 | Sampson | B60L 58/18 |
| 11,654,762 | B2 * | 5/2023 | Kohara | B60K 6/26 180/65.21 |

* cited by examiner

*Primary Examiner* — James A Shriver, II
*Assistant Examiner* — Nicholas R. Kandas
(74) *Attorney, Agent, or Firm* — MORGAN, LEWIS & BOCKIUS LLP

(57) ABSTRACT

A floor structure of a rear vehicle body, in which at least one component including a high-voltage battery is mounted in a rear portion of a vehicle body, includes: a first cross member coupled to each front portion of first and second rear side members in a vehicle width direction; and a second cross member coupled to the first and second rear side members at a rear of the corresponding first cross member in the vehicle width direction, wherein a space in which the at least one component is mounted is formed between the first cross member and the second cross member.

15 Claims, 7 Drawing Sheets

FLOOR STRUCTURE OF REAR VEHICLE BODY

CROSS-REFERENCE TO RELATED APPLICATION

The present application claims priority to Korean Patent Application No. 10-2021-0104417 filed on Aug. 9, 2021, the entire contents of which is incorporated herein for all purposes by this reference.

BACKGROUND OF THE PRESENT DISCLOSURE

Field of the Present Disclosure

The present disclosure relates to a structure of a rear vehicle body, and more particularly, to a rear floor structure, in which a high-voltage battery or the like is mounted.

Description of Related Art

In general, a high-voltage battery applying power to a drive motor may be mounted in a hybrid vehicle, an electric vehicle, a hybrid electric vehicle or a hydrogen-powered vehicle (also referred to as a 'hydrogen electric vehicle' by those skilled in the art), which are referred to as an eco-friendly vehicle.

For example, in the case of a general hydrogen-powered vehicle, the high-voltage battery may be mounted in a rear floor structure of a rear portion of a vehicle body.

Furthermore, components such as a hydrogen tank, the drive motor, an inverter, a 12V battery and a cooling module may be mounted in the rear floor structure.

In recent years, a hydrogen electric vehicle-based super sports vehicle has been introduced as a purpose built vehicle.

However, such a hydrogen electric vehicle-based super sports vehicle may have difficulty in mounting the high-voltage battery and other components in a limited space in the rear portion of the vehicle body, and may cause damage to the high-voltage battery and other components when a vehicle crash occurs due to a decrease in skeletal rigidity of the rear portion of the body.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a floor structure of a rear vehicle body which may increase skeletal rigidity of a rear portion of a vehicle body and protect components including a high-voltage battery when a vehicle crash occurs.

According to various exemplary embodiments of the present disclosure, a floor structure of a rear vehicle body, in which at least one component including a high-voltage battery is mounted in a rear portion of a vehicle body, includes: i) a first cross member coupled to each front portion of first and second rear side members in a vehicle width direction; and ii) a second cross member coupled to the first and second rear side members at a rear of the corresponding first cross member in the vehicle width direction, wherein a space in which the at least one component is mounted is formed between the first cross member and the second cross member.

Furthermore, the floor structure of a rear vehicle body may further include first and second side sills respectively coupled to first and second sides of the first cross member in a longitudinal direction of the vehicle thereof.

Furthermore, the first cross member and the second cross member may be connected to each of the first and second rear side members to have a square shape therebetween.

Furthermore, the floor structure of a rear vehicle body may further include: a rear floor front portion formed by each of the first cross member, the first side sill and the second side sill; a rear floor center portion formed at a rear of the rear floor front portion by each of the first cross member, the second cross member, the first rear side member and the second rear side member; and a rear floor rear portion formed at a rear of the rear floor center portion by each of the second cross member, the first rear side member and the second rear side member.

Furthermore, the floor structure of a rear vehicle body may further include a front floor panel connected to each of the first cross member, the first side sill and the second side sill.

Furthermore, the floor structure of a rear vehicle body may further include a rear floor panel connected to a rear portion of each of the second cross member, the first rear side member and the second rear side member.

Furthermore, at least one open hole may be formed in the front floor panel.

Furthermore, a battery mounting space may be formed in the front floor panel by each of the first cross member, the first side sill and the second side sill.

Furthermore, a tunnel member may be coupled to a front portion of the front floor panel.

Furthermore, a tunnel reinforcement member may be coupled to an upper surface of the tunnel member.

Furthermore, the floor structure of a rear vehicle body may further include: a battery lower fixing unit positioned at each of the first cross member, the first side sill and the second side sill; and a battery upper fixing unit positioned at a lower internal side of the front floor panel.

Furthermore, the battery lower fixing unit may include a plurality of weld bolts positioned on a lower surface of the first cross member, and a plurality of weld nuts positioned on each lower surface of the first and second side sills.

Furthermore, the battery upper fixing unit may include at least one mounting bracket coupled to an upper internal surface of the front floor panel.

Furthermore, between the first cross member and the second cross member, a shock absorber cover panel may be coupled to an upper surface of each of the first and second rear side members.

Furthermore, between the first cross member and the second cross member, at least one chassis arm mounting member may be coupled to an external surface of each of the first and second rear side members.

Furthermore, the front floor panel connected to each of the first cross member, the first side sill and the second side sill may be positioned in the rear floor front portion.

Furthermore, the high-voltage battery may be provided inside the front floor panel by the first cross member, the first and second side sills and the front floor panel.

Furthermore, a drive motor and an inverter may be provided in the space formed by the first cross member, the second cross member, the first rear side member and the second rear side member.

Furthermore, a hydrogen tank may be provided above the drive motor and the inverter.

Furthermore, the rear floor panel connected to each of the second cross member, the first rear side member and the second rear side member may be positioned in the rear floor rear portion.

Furthermore, a 12V battery may be provided on an upper surface of the rear floor panel.

Furthermore, a cooling module may be provided on a lower surface of the rear floor panel.

The exemplary embodiments of the present disclosure may secure the space in which the high-voltage battery is mounted in a limited space in the rear portion of the vehicle body, increase the skeletal rigidity, and minimize damage to the components such as the high-voltage battery and injury to the passenger when the vehicle crash occurs.

Another effect which may be obtained or predicted by various exemplary embodiments of the present disclosure is disclosed directly or implicitly in the detailed description of various exemplary embodiments of the present disclosure.

That is, various effects predicted by various exemplary embodiments of the present disclosure are disclosed in the detailed description described below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
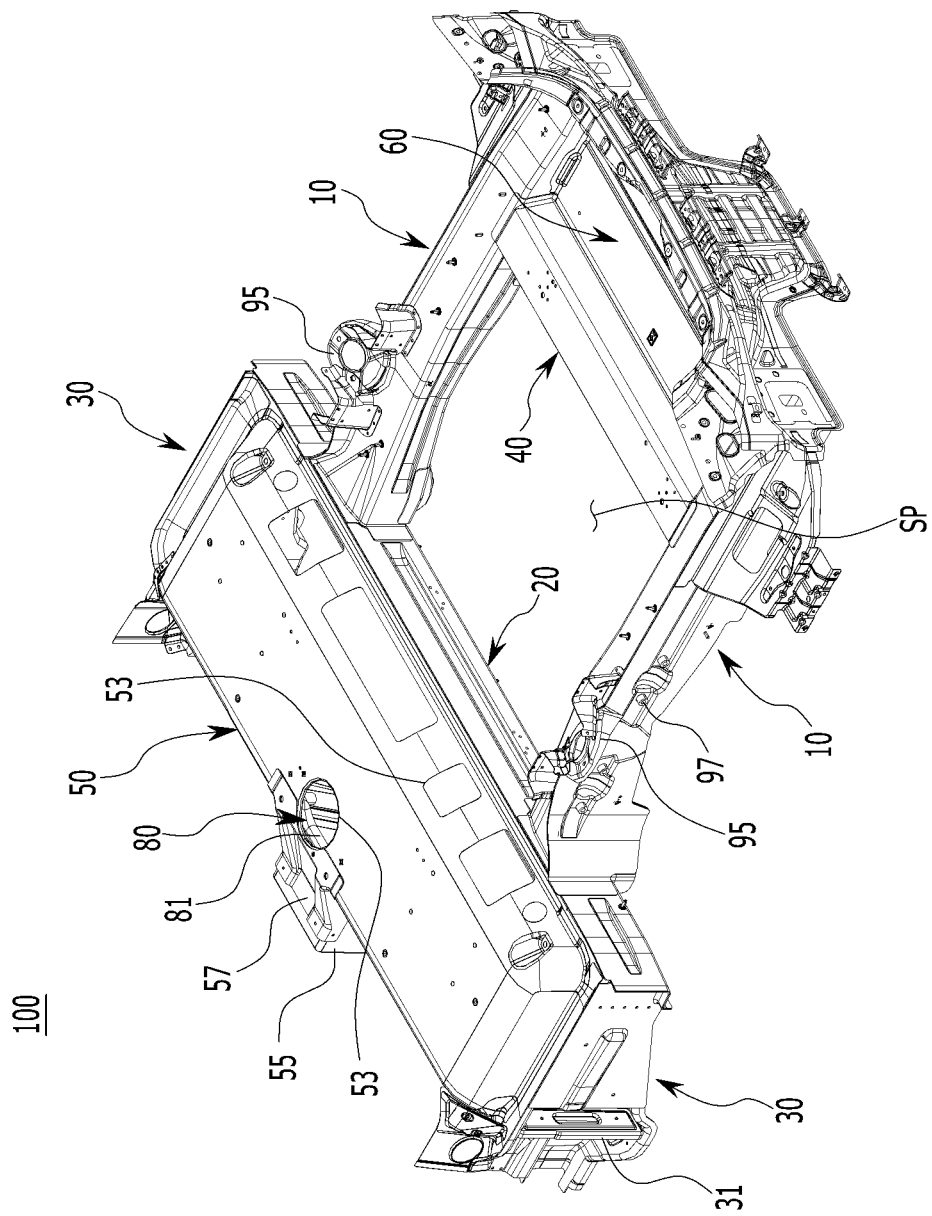
FIG. 1 and FIG. 2 are perspective views each showing a floor structure of a rear vehicle body according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Terms in the exemplary embodiment are used to describe specific exemplary embodiments of the present disclosure, and are not intended to limit the present disclosure.

Singular forms used herein are intended to include plural forms unless the context clearly indicates otherwise.

It is to be understood that terms "include" or "have" used in the exemplary embodiment specify the presence of features, numerals, steps, operations, elements and/or components, and do not preclude the presence or addition of one or more other features, numerals, steps, operations, components and/or groups thereof.

The term "and/or" used herein includes any one or all combinations of one or more associated listed items.

A term "coupled" used herein indicates a physical relationship between two components directly connected to each other by welding or the like, or indirectly connected to each other through one or more medium components.

"Vehicle," "of a vehicle," "automobile" or other similar terms used herein generally refer to a passenger vehicle including a sports car, a sports utility vehicle (SUV), a bus, a truck and a passenger automobile including various commercial vehicles, and also refer to a hybrid vehicle, an electric vehicle, a hybrid electric vehicle, a hydrogen powered vehicle, and a vehicle using another alternative fuel (e.g., fuel derived from resources other than petroleum).

Hereinafter, various exemplary embodiments of the present disclosure are described in detail with reference to the accompanying drawings.

Figure 2:
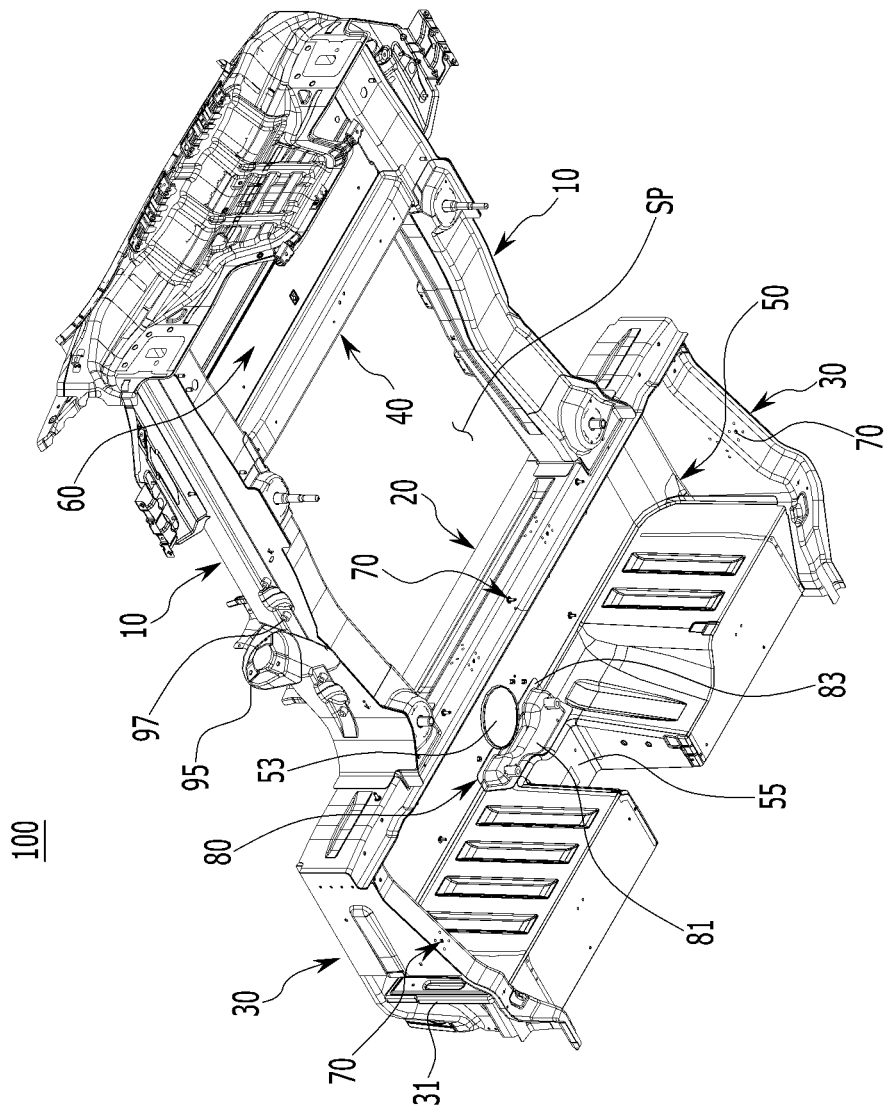
Figure 3:
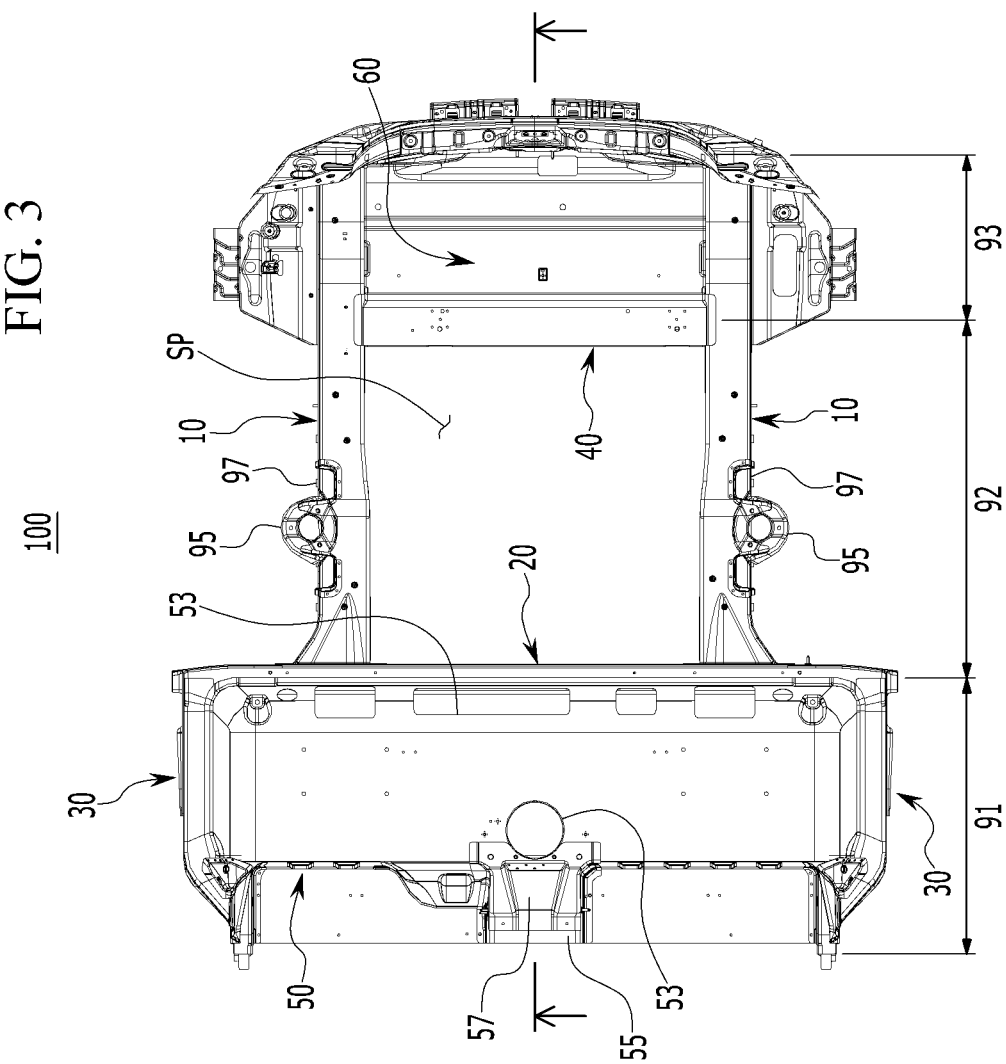
FIG. 3 is a plan view showing the floor structure of a rear vehicle body according to various exemplary embodiments of the present disclosure.
Figure 4:
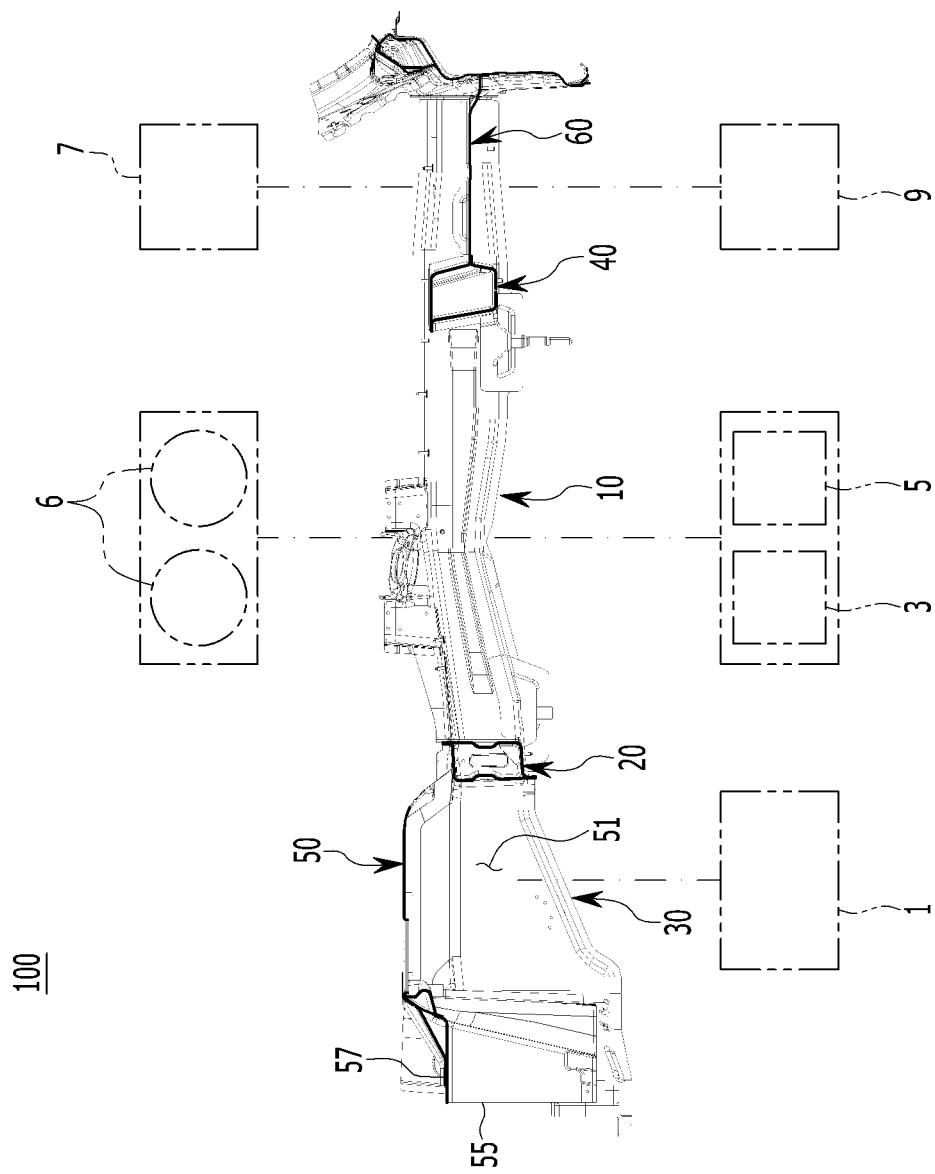
FIG. 4 is a cross-sectional view showing the floor structure of a rear vehicle body according to various exemplary embodiments of the present disclosure.

FIG. 1 and FIG. 2 are perspective views each showing a floor structure of a rear vehicle body according to various exemplary embodiments of the present disclosure; FIG. 3 is a plan view showing the floor structure of a rear vehicle body according to various exemplary embodiments of the present disclosure; and FIG. 4 is a cross-sectional view showing the floor structure of a rear vehicle body according to various exemplary embodiments of the present disclosure.

Referring to FIG. 1, FIG. 2, FIG. 3, and FIG. 4, a floor structure of a rear vehicle body 100 according to various exemplary embodiments of the present disclosure may be applied to a body of an electric vehicle and furthermore, a body of a hydrogen electric vehicle-based super sports car.

For example, such a super sports vehicle may include two rows of seats for a driver's seat and a passenger seat positioned in a front portion of the vehicle body.

Components including a high-voltage battery 1, a drive motor 3, an inverter 5, a hydrogen tank 6, a 12V battery 7 and a cooling module 9 may be mounted in a rear portion of the vehicle body.

As described above, various exemplary embodiments of the present disclosure is described as being applied to the body of the hydrogen electric vehicle-based super sports car. However, the scope of the present disclosure is not necessarily limited thereto.

Accordingly, the spirit of the present disclosure may be applied to a body of an eco-friendly vehicle including a conventional hybrid vehicle, an electric vehicle, a hybrid electric vehicle and a hydrogen powered vehicle.

In the exemplary embodiment, a 'vehicle front and rear direction' may be defined as a longitudinal direction of the vehicle body, a 'vehicle width direction' may be defined as the left and right direction of the vehicle body, and an 'up and down direction' may be defined as a height direction of the vehicle body.

Furthermore, in the exemplary embodiment, an 'inner surface' of a component may indicate each corresponding surface of two components spaced from each other, and an 'outer surface' of a component may indicate a surface opposite to the inner surface.

Furthermore, in the exemplary embodiment, the 'upper end portion', 'upper portion', 'upper end' or 'upper surface' of a component may indicate the end portion, portion, end or surface of a component positioned on a relatively upper side in the drawings, and the 'lower end portion', 'lower portion', 'lower end' or 'lower surface' may indicate the end portion, portion, end or surface of a component positioned on a relatively lower side in the drawings.

Furthermore, in the exemplary embodiment, an end of a component (e.g., one end or another end or the like) may indicate an end of the component in any one direction, and an end portion of a component (e.g., one end portion or the other end portion or the like) may indicate a certain portion of the component including an end thereof.

Meanwhile, the floor structure of the rear vehicle body 100 according to various exemplary embodiments of the present disclosure may be applied to the rear floor structure of the rear portion of the vehicle body in which the above-described components including the high-voltage battery 1 may be mounted.

The floor structure of the rear vehicle body 100 according to various exemplary embodiments of the present disclosure may provide a rear floor structure which may secure a space in which the components including the high-voltage battery 1 may be mounted in a limited space of the rear portion of the vehicle body.

Furthermore, the floor structure of the rear vehicle body 100 according to various exemplary embodiments of the present disclosure may provide a rear floor structure which may increase skeletal rigidity of the rear portion of the vehicle body, and protect the components including the high-voltage battery 1 when a vehicle crash occurs.

To the present end, the floor structure of the rear vehicle body 100 according to various exemplary embodiments of the present disclosure may include two rear side members 10, a first cross member 20, two side sills 30, a second cross member 40, a front floor panel 50, a rear floor panel 60, a battery lower fixing unit 70 and a battery upper fixing unit 80.

In various exemplary embodiments of the present disclosure, the two rear side members 10 may extend from the rear portion of the vehicle body in the vehicle front and rear direction and respectively provided on the left and right sides of the vehicle body in the vehicle width direction.

For example, each of the two rear side members 10 may have a rectangular box shape.

In various exemplary embodiments of the present disclosure, the first cross member 20 may be coupled to each front portion of two rear side members 10 in the vehicle width direction.

For example, the first cross member 20 may have at least two members coupled to each other, or have at least one reinforcing unit such as a bulkhead mounted in a space formed between the at least two members.

In various exemplary embodiments of the present disclosure, the two side sills 30 may be included in side portions of the rear floor structure.

The two side sills 30 may respectively be coupled to both sides (or both end portions) of the first cross member 20 in the vehicle front and rear direction.

At least one reinforcement member 31 may be coupled to an external surface of one of the two side sills 30.

For example, each of the two side sills 30 may have at least two members coupled to each other, and at least one reinforcing unit such as a bulkhead mounted in a space formed between the at least two members.

In various exemplary embodiments of the present disclosure, the second cross member 40 may be coupled to the rear portions of two rear side members 10 at the rear away from the corresponding first cross member 20 in the vehicle width direction.

For example, the second cross member 40 may have at least two members coupled to each other, or have at least one reinforcing unit such as a bulkhead mounted in a space formed between the at least two members.

The first cross member 20 and the second cross member 40 as described above may be connected to each of the two rear side members 10 to have a square shape therebetween.

Furthermore, a space SP in which the above-described components are mounted may be formed between the first cross member 20 and the second cross member 40.

In various exemplary embodiments of the present disclosure, the front floor panel 50 may be connected to each of the first cross member 20 and the two side sills 30.

The front floor panel 50 may form a space set inside.

Here, the inside may be defined as an internal region of the front floor panel 50 having an open lower portion.

The front floor panel 50 may be coupled to an upper surface of the first cross member 20, each upper surface of the two side sills 30, and each internal surface of the two side sills 30.

Here, a dome-shaped battery mounting space 51 may be formed in the front floor panel 50 by each of the first cross member 20 and the two side sills 30.

The battery mounting space 51 may be formed as an internal space of the front floor panel 50 in which the high-voltage battery 1 may be mounted.

Furthermore, at least one open hole 53 may be formed in the front floor panel 50.

The at least one open hole 53 may be the plurality of open holes, and one of the plurality of open holes 53 may be formed in a front side of an upper surface of the front floor panel 50.

Furthermore, the rest of the plurality of open holes 53 may be formed in a rear side of the upper surface of the front floor panel 50.

Here, the plurality of open holes 53 may allow a unit cooling the high-voltage battery 1 to pass therethrough and make maintenance of the high-voltage battery 1 easy.

Furthermore, a tunnel member 55 may be coupled to a front portion (or front surface) of the front floor panel 50.

The tunnel member 55 may allow an electric wire or the like connected to the high-voltage battery 1 to pass therethrough.

Furthermore, a tunnel reinforcement member 57 may be coupled to an upper surface of the tunnel member 55.

The tunnel reinforcement member 57 may reinforce rigidity of the tunnel member 55 and rigidity of the upper surface of the front floor panel 50.

In various exemplary embodiments of the present disclosure, the rear floor panel 60 may be connected to a rear portion of each of the second cross member 40 and the two rear side members 10.

The rear floor panel 60 may be coupled to a rear surface of the second cross member 40 and each internal surface of the two rear side members 10.

In various exemplary embodiments of the present disclosure, the battery lower fixing unit 70 may serve to fix a lower portion of the high-voltage battery 1 provided in the battery mounting space 51 of the front floor panel 50 to each of the first cross member 20 and the two side sills 30.

The battery lower fixing unit 70 may be positioned at each of the first cross member 20 and the two side sills 30.

Figure 5A:
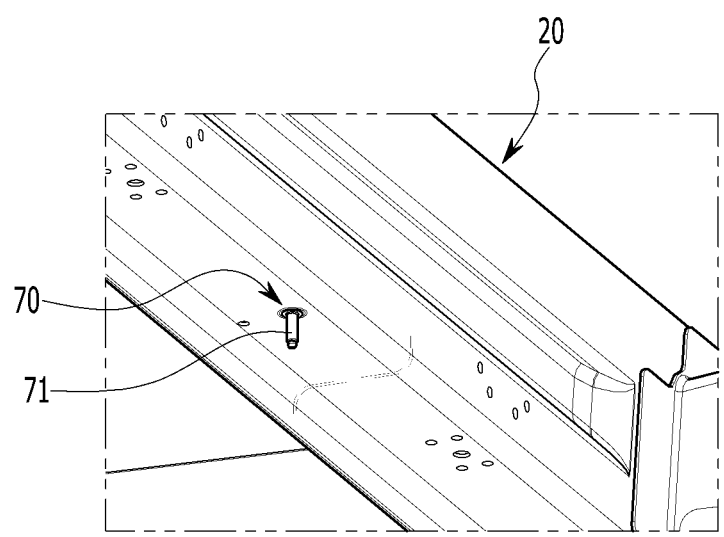
FIG. 5A, FIG. 5B and FIG. 6 are views each showing a battery lower fixing unit region applied to the floor structure of a rear vehicle body according to various exemplary embodiments of the present disclosure.
Figure 5B:
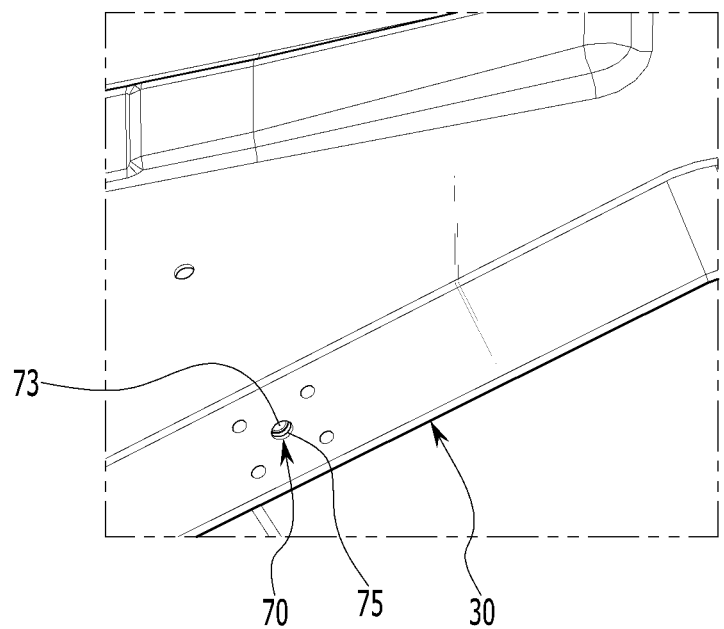

As shown in FIG. 5A and FIG. 5B, the battery lower fixing unit 70 may include a plurality of weld bolts 71 and a plurality of weld nuts 73.

The plurality of weld bolts 71 may be positioned on a lower surface of the first cross member 20.

The plurality of weld bolts 71 may be coupled (e.g., welded) to the lower surface of the first cross member 20 and extending vertically from the lower surface.

Here, the plurality of weld bolts 71 may be inserted into a plurality of bolt fastening portions positioned in the high-voltage battery 1 and may be fastened to a plurality of nuts.

The plurality of weld nuts 73 may be positioned on each lower surface of the two side sills 30.

The plurality of weld nuts 73 may be coupled (e.g., welded) to each lower surface of the two side sills 30, and connected to a plurality of fastening holes 75 formed in each lower surface of the two side sills 30.

The plurality of weld nuts 73 may be inserted into the plurality of nut fastening portions positioned in the high-voltage battery 1 and may be fastened to the plurality of bolts.

Figure 6:
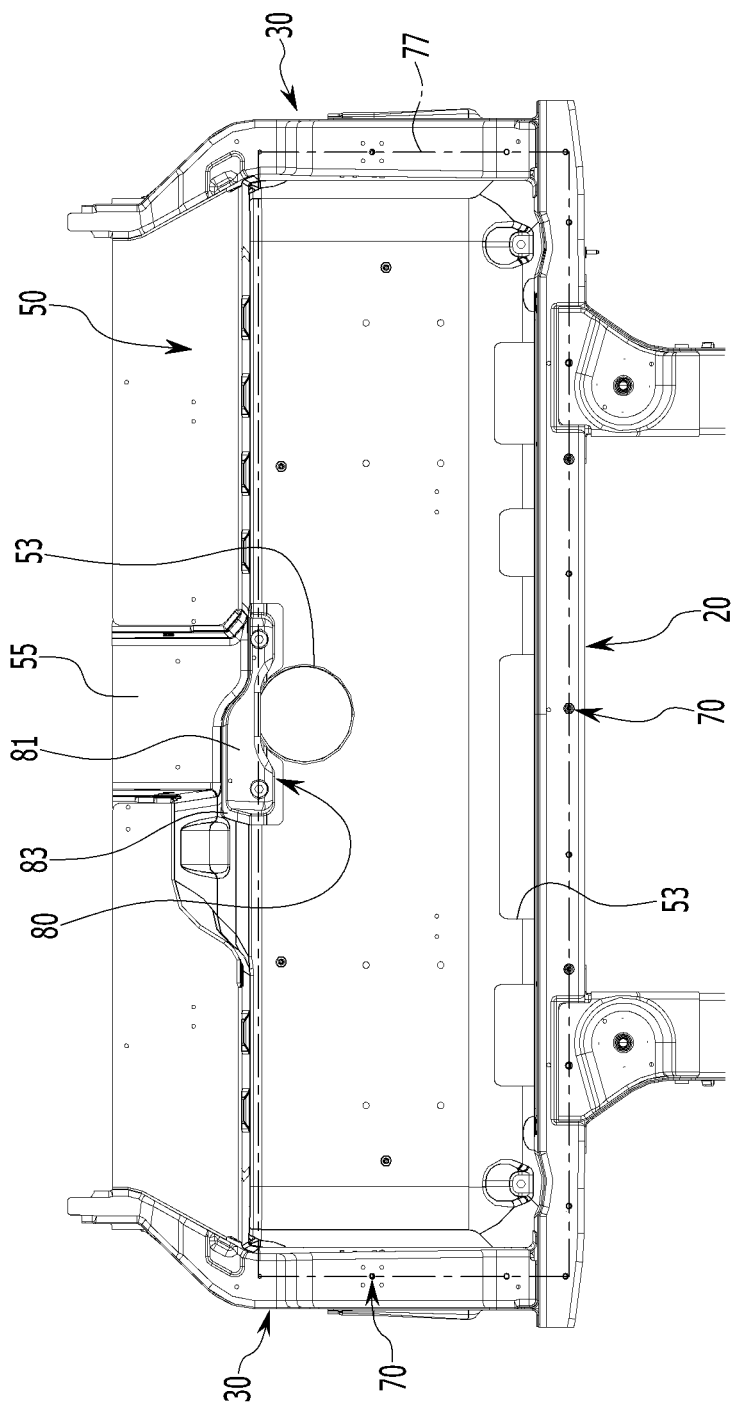

Here, as shown in FIG. 5A, FIG. 5B and FIG. 6, each of the first cross member 20 and the two side sills 30 may be configured to form a rectangular battery mounting section 77 by the plurality of weld bolts 71, the plurality of weld nuts 73 and the front floor panel 50, based on a direction toward a bottom surface of the front floor panel 50.

Referring to FIG. 2 and FIG. 3, in various exemplary embodiments of the present disclosure, the battery upper fixing unit 80 may serve to fix an upper portion of the high-voltage battery 1 provided in the battery mounting space 51 of the front floor panel 50 to an upper internal surface of the front floor panel 50.

The battery upper fixing unit 80 may be positioned at a lower internal side of the front floor panel 50.

The battery upper fixing unit 80 may include at least one mounting bracket 81 coupled to the upper internal surface of the front floor panel 50.

The at least one mounting bracket 81 may be joined to a front center portion of the front floor panel 50 from the upper internal surface of the front floor panel 50 through a joint flange 83.

Meanwhile, the floor structure of the rear vehicle body 100 according to various exemplary embodiments of the present disclosure configured as described above may include a rear floor front portion 91 positioned on a front side, a rear floor center portion 92 positioned on a central side, and a rear floor rear portion 93 positioned on a rear side.

The rear floor front portion 91 may be formed by the first cross member 20, each of the two side sills 30, and the front floor panel 50.

The above-described battery mounting space 51 may be formed in the rear floor front portion 91.

Accordingly, the high-voltage battery 1 may be provided in the battery mounting space 51 of the rear floor front portion 91 formed by the first cross member 20, each of the two side sills 30 and the front floor panel 50.

The rear floor center portion 92 may be formed at the rear of the rear floor front portion 91 by each of the first cross member 20, the second cross member 40 and the two rear side members 10.

The rear floor center portion 92 may have a rectangular shape by each of the first cross member 20, the second cross member 40 and the two rear side members 10.

A shock absorber cover panel 95 may be coupled to an upper surface of each or at least one of the two rear side members 10 positioned between the first cross member 20 and the second cross member 40 in the rear floor center portion 92.

Furthermore, at least one chassis arm mounting member 97 may be coupled to an external surface of each of the two rear side members 10.

Furthermore, the drive motor 3 and the inverter 5 may be provided in the rear floor center portion 92 formed by each of the first cross member 20, the second cross member 40 and the two rear side members 10.

That is, the drive motor 3 and the inverter 5 may be provided in the space SP formed by the first cross member 20, the second cross member 40 and the two rear side members 10.

Furthermore, the corresponding drive motor 3 and inverter 5 may be provided on a lower side of the rear floor center portion 92, and at least one hydrogen tank 6 may be provided in the space SP formed by each of the first cross member 20, the second cross member 40 and the two rear side members 10.

That is, the at least one hydrogen tank 6 may be provided above the drive motor 3 and the inverter 5.

The drive motor 3, the inverter 5 and the at least one hydrogen tank 6 may be positioned on a mounting unit (e.g., mounting bracket) coupled to each of the first cross member 20, the second cross member 40 and the two rear side members 10.

The rear floor rear portion 93 may be formed at the rear of the rear floor center portion 92 by the second cross member 40, each of the two rear side members 10 and the rear floor panel 60.

The 12V battery 7 may be provided on an upper surface of the rear floor panel 60 in the rear floor rear portion 93 formed by each of the second cross member 40 and the two rear side members 10.

Furthermore, a cooling module 9 may be provided on a lower surface of the rear floor panel 60 by each of the second cross member 40 and the two rear side members 10.

The 12V battery 7 and the cooling module 9 may be provided on a mounting unit (e.g., mounting bracket) coupled to the second cross member 40, each of the two rear side members 10 and the rear floor panel 60.

Hereinafter, the description describes an operation of the floor structure of the rear vehicle body 100 according to various exemplary embodiments of the present disclosure configured as described above in detail with reference to FIGS. 1 to 6.

First provided are the first cross member 20, each of the two side sills 30, and the rear floor front portion 91 formed by the front floor panel 50.

Also provided is the rear floor center portion 92 formed at the rear of the rear floor front portion 91 by each of the first cross member 20, the second cross member 40 and the two rear side members 10.

Further provided is the rear floor rear portion 93 formed at the rear of the rear floor center portion 92 by the second cross member 40, each of the two rear side members 10 and the rear floor panel 60.

Here, the battery mounting space 51 may be formed in the rear floor front portion 91.

Furthermore, the rear floor center portion 92 may have the rectangular shape by each of the first cross member 20, the second cross member 40 and the two rear side members 10.

In the floor structure of the rear vehicle body 100, the high-voltage battery 1 may be provided in the battery mounting space 51 of the rear floor front portion 91.

The lower portion of the high-voltage battery 1 may be fastened to the plurality of weld bolts 71 positioned on the lower surface of the first cross member 20.

Furthermore, the lower portion of the high-voltage battery 1 may be fastened to the plurality of weld bolts 73 positioned on each lower surface of the two side sills 30.

The lower portion of the high-voltage battery 1 may be fastened to the plurality of weld bolts 71 and the plurality of weld nuts 73 in the rectangular battery mounting section 77.

In the floor structure of the rear vehicle body 100, the drive motor 3, the inverter 5 and the at least one hydrogen tank 6 may be provided in the rear floor center portion 92.

The drive motor 3 and the inverter 5 may be provided on the lower side of the rear floor center portion 92, and the at least one hydrogen tank 6 may be provided on an upper side thereof.

In the floor structure of the rear vehicle body 100, the 12V battery 7 and the cooling module 9 may be provided in the rear floor rear portion 93.

In the rear floor rear portion 93, the 12V battery 7 may be provided on the upper surface of the rear floor panel 60, and the cooling module 9 may be provided on the lower surface of the rear floor panel 60.

Accordingly, the floor structure of the rear vehicle body 100 according to various exemplary embodiments of the present disclosure may secure the space SP in which the high-voltage battery 1, the drive motor 3, the inverter 5, and the hydrogen tank 6, the 12V battery 7 and the cooling module 9 are mounted in a limited space of the rear portion of the vehicle body.

Furthermore, in the floor structure of the rear vehicle body 100 according to various exemplary embodiments of the present disclosure, the two rear side members 10, the first cross member 20 and the second cross member 40 may be coupled to one another in a set shape (e.g., 卅 shape).

Accordingly, the floor structure of the rear vehicle body 100 according to various exemplary embodiments of the present disclosure may reinforce connectivity of the members to increase the skeletal rigidity which may counter a shear stress and a torsional deformation.

Furthermore, the floor structure of the rear vehicle body 100 according to various exemplary embodiments of the present disclosure may effectively distribute a crash load transmitted to the vehicle width direction and the vehicle front and rear direction when the side crash and rear crash of the vehicle occur.

Accordingly, the floor structure of the rear vehicle body 100 according to various exemplary embodiments of the present disclosure may minimize damage to the components such as the high-voltage battery 1 and injury to a passenger when the vehicle crash occurs.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A floor structure of a rear vehicle body, in which at least one component including a high-voltage battery is mounted in a rear portion of a vehicle body, the floor structure comprising:
    a first cross member coupled to each front portion of first and second rear side members in a width direction of a vehicle; and
    a second cross member coupled to the first and second rear side members at a rear of the corresponding first cross member in the width direction of the vehicle,
    wherein a space in which the at least one component is mounted is formed between the first cross member and the second cross member,
    wherein the floor structure further includes:
        first and second side sills respectively coupled to first and second sides of the first cross member in a longitudinal direction of the vehicle,
        a rear floor front portion formed by each of the first cross member, the first side sill and the second side sill;
        a rear floor center portion formed at a rear of the rear floor front portion by each of the first cross member, the second cross member, the first rear side member and the second rear side member; and
        a rear floor rear portion formed at a rear of the rear floor center portion by each of the second cross member, the first rear side member and the second rear side member,
    wherein the high-voltage battery is provided in a battery mounting space formed to the rear floor front portion,
    wherein a drive motor and an inverter are provided in a space formed to the rear floor center portion, and
    wherein a hydrogen tank is provided above the drive motor and the inverter.

2. The floor structure of claim 1,
    wherein the first cross member and the second cross member are connected to each of the first and second rear side members to have a square shape therebetween.

3. The floor structure of claim 1, further including:
    a front floor panel connected to each of the first cross member, the first side sill and the second side sill.

4. The floor structure of claim 1, further including:
    a rear floor panel connected to a rear portion of each of the second cross member, the first rear side member and the second rear side member.

5. The floor structure of claim 3,
wherein at least one open hole is formed in the front floor panel.

6. The floor structure of claim 3,
wherein the battery mounting space is formed in the front floor panel by each of the first cross member, the first side sill and the second side sill.

7. The floor structure of claim 6,
wherein the high voltage battery is provided on an lower surface of the front floor panel.

8. The floor structure of claim 3,
wherein a tunnel member is coupled to a front portion of the front floor panel.

9. The floor structure of claim 8,
wherein a tunnel reinforcement member is coupled to an upper surface of the tunnel member.

10. The floor structure of claim 3, further including:
a battery lower fixing unit positioned at each of the first cross member, the first side sill and the second side sill; and
a battery upper fixing unit positioned at a lower internal side of the front floor panel.

11. The floor structure of claim 10,
wherein the battery upper fixing unit includes at least one mounting bracket coupled to an upper internal surface of the front floor panel.

12. The floor structure of claim 11,
wherein the at least one mounting bracket is joined to a front center portion of the front floor panel from the upper internal surface of the front floor panel through a joint flange.

13. The floor structure of claim 1, wherein
between the first cross member and the second cross member,
a shock absorber cover panel is coupled to an upper surface of each of the first and second rear side members.

14. The floor structure of claim 13, wherein at least one chassis arm mounting member is coupled to an external surface of each of the first and second rear side members.

15. The floor structure of claim 4,
wherein a 12V battery is provided on an upper surface of the rear floor panel, and
wherein a cooling module is provided on a lower surface of the rear floor panel.

* * * * *